L. SAIVES.
SPEED LIMITING MECHANISM FOR VEHICLES.
APPLICATION FILED NOV. 11, 1920.
1,424,523.
Patented Aug. 1, 1922.
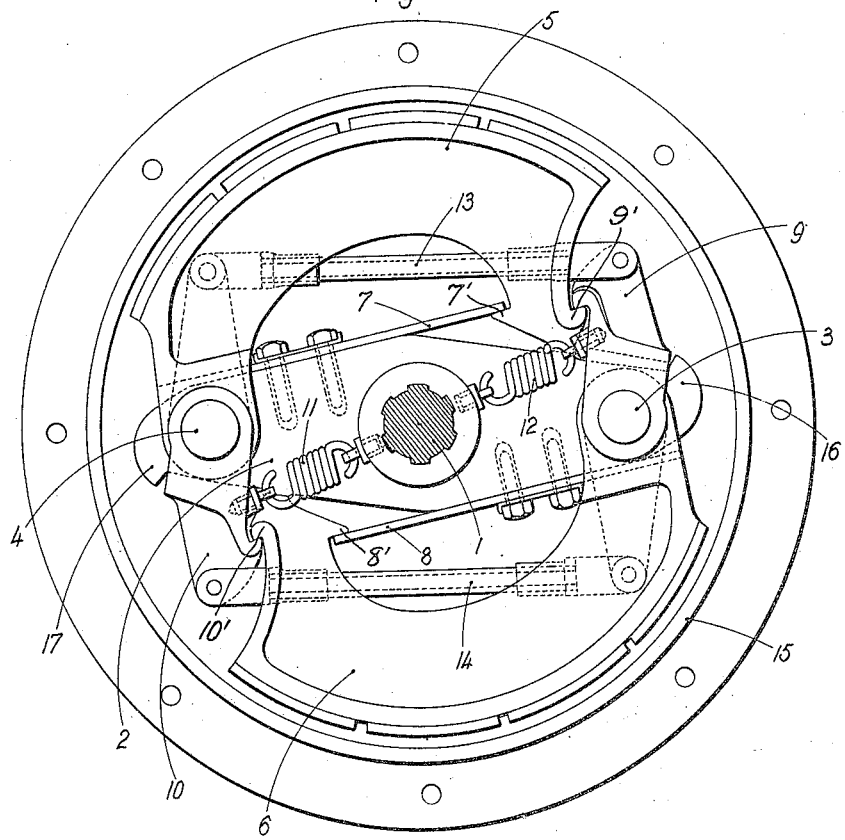
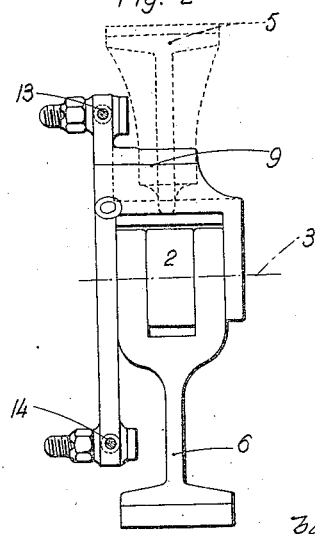
Inventor.
Lion Saives
By Chas. J. O'Neill
Atty

UNITED STATES PATENT OFFICE.

LÉON SAIVES, OF BILLANCOURT, FRANCE, ASSIGNOR TO LOUIS RENAULT, OF BILLANCOURT, SEINE, FRANCE.

SPEED-LIMITING MECHANISM FOR VEHICLES.

1,424,523.   Specification of Letters Patent.   Patented Aug. 1, 1922.

Application filed November 11, 1920. Serial No. 423,323.

*To all whom it may concern:*

Be it known that I, LÉON SAIVES, citizen of the French Republic, residing at Billancourt, Department of the Seine, in France, and having P. O. address 15 Rue Gustave-Sandoz, in the said city, have invented certain new and useful Improvements in Speed-Limiting Mechanism for Vehicles; and I do hereby declare the following to be a full, clear, and exact description of the invention, such as will enable others skilled in the art to which it appertains to make and use the same.

The present invention relates to a special arrangement of mechanism the object of which is to limit the maximum speed that can be acquired by the vehicle and especially an automobile vehicle of the wagon or transport type.

The mechanism is essentially characterized in that assuming the limit of speed to be fixed the said mechanism acts as a brake, the braking action ceasing only when the vehicle moves at a lower speed than limiting speed. That is to say that the mechanism becomes inoperative at a speed lower than the fixed speed limit.

The mechanism is provided for the following reasons:—

1st. In order that the driver himself cannot voluntarily exceed the maximum speed limit and in order to avoid the operation necessary to slacken or reduce the speed of the vehicle.

2nd. In order to prevent the driver who relying on the braking action of the aforesaid mechanism might run the vehicle continuously without utilizing the ordinary brake which would consequently become useless; or where he effects the reduction in speed by relying solely on the braking effect of the aforesaid mechanism, which would result in consequent premature deterioration of the said mechanism. The purpose of the mechanism is to act as a brake for the vehicle when the latter attains a predetermined speed limit, then compelling the driver to slacken to a speed below this predetermined speed limit in order to obtain release of the brake actuated by the aforesaid mechanism.

In the accompanying drawing:—

Figure 1 shows in elevation a general arrangement of the mechanism in accordance with the present invention, and Figure 2 is a part end elevation of the mechanism.

The mechanism which functions under the action of centrifugal force is constructed as follows:—

The transmission shaft 1 of a vehicle is provided with an actuating member 2 between the gear box and the wheels at any suitable place, but preferably between the box and the rear axle and on a part not subjected to the displacement of springs.

This member carries two pivot pins 3, 4 on which are pivoted two brake-segments 5, 6.

The brake segments 5, 6 are maintained in their normal or inoperative position by plate springs 7 and 8 secured to the actuating member 2, by bolts or the like and having their free ends adapted to engage shoulders 7′ and 8′ formed on the inner edges of the free ends of the segments 5 and 6 respectively.

These brake-segments are further maintained in their normal or inoperative position by two gripping levers 9, 10 which engage two tooth-like projections 9′ and 10′ provided on the outer edges of the free ends of the segments 5, 6 respectively.

The levers 9, 10 are maintained in gripping position by two springs 11 and 12. The outer ends of these springs are connected to the gripping jaws 9 and 10 respectively, and the inner ends thereof are secured to a collar or the like carried by the shaft 1.

The two levers 9, 10 are connected together by two rods 13, 14 the pivots of which are so disposed that the levers 9, 10 and the rods 13, 14 form a parallelogram the sides 13, 14 of which are situated on opposite sides of the axes 3, 4.

The levers 9, 10 are constructed so as to be slightly heavier on the gripping end.

A brake drum 15 is secured on the chassis of the vehicle so that the segments 5, 6 when expanded bear on the drum 15 and ensure the desired braking.

As long as the speed does not exceed a certain limit the action of the springs 11 and 12 preponderates over that of the centrifugal force acting on the levers 9 and 10 tending to disengage them from their gripping position.

The segmental brake masses 5 and 6 are maintained in their inoperative position despite the centrifugal force acting on them.

When the speed limit is reached, the centrifugal force acting on the levers 9 and 10 becomes operative to disengage the levers from their gripping position thereby releasing the brake-segments 5 and 6 which under the action of centrifugal force act frictionally on the drum 15.

The weight of the segments 5, 6 is calculated so that the speed of the wagon is reduced in consequence of the automatic braking action.

In order to suppress the automatic braking action the driver is obliged to actuate the ordinary brakes of the vehicle so as to reduce the speed of the vehicle to a much lower speed.

At this moment, when the speed has become very low, the action of the springs 7, 8 and 11, 12 again preponderates over that of the centrifugal force and the segmental brake masses 5, 6 as well as the levers 9, 10 return to their normal gripping position.

The actuating member 2 carries two toothlike projections 16, 17 which are engaged by the levers 9, 10 in order to prevent them being thrown outwardly by centrifugal action and rubbing against the drum 15.

It is obvious, to any expert mechanic, that certain details in the construction of the mechanism could be modified without departing from the nature of the invention.

Claims:

1. In a speed limiting mechanism, the combination with a rotary member and a stationary member, of an actuating member carried by said rotary member, brake segments pivoted to the opposite ends of said actuating member, centrifugally controlled levers also pivoted in the outer ends of said actuating member, means carried by said levers for gripping said segments and normally maintaining them out of engagement with the stationary member but permitting their release when the rotary member attains a predetermined maximum speed, and means tending to automatically return the brake segments to normal or inoperative position to be again engaged by the gripping levers upon the reduction of speed of said rotary member.

2. In a speed limiting mechanism, the combination with a rotary member and a stationary member, of an actuating member carried by said rotary member, brake segments pivoted to the opposite ends of said actuating member, centrifugally controlled levers also pivoted in the outer ends of said actuating member, means carried by said levers for gripping said segments and normally maintaining them out of engagement with the stationary member but permitting their release when the rotary member attains a predetermined maximum speed, means for connecting the centrifugally controlled levers together so that the same will act in unison, springs for automatically returning said braking segments to normal or inoperative position and springs for automatically returning the said levers to again grip the brake segments upon the reduction of speed of the rotary member.

In testimony whereof I affix my signature.

LÉON SAIVES.